United States Patent
Wu et al.

(10) Patent No.: US 10,003,740 B2
(45) Date of Patent: Jun. 19, 2018

(54) INCREASING SPATIAL RESOLUTION OF PANORAMIC VIDEO CAPTURED BY A CAMERA ARRAY

(71) Applicant: Futurewei Technologies, Inc., Plano, TX (US)

(72) Inventors: Zhenyu Wu, Plainsboro, NJ (US); Muhammad Twaha Naqash Ibrahim, Madison, WI (US)

(73) Assignee: Futurewei Technologies, Inc., Plano, TX (US)

( * ) Notice: Subject to any disclaimer, the term of this patent is extended or adjusted under 35 U.S.C. 154(b) by 357 days.

(21) Appl. No.: 14/797,477

(22) Filed: Jul. 13, 2015

(65) Prior Publication Data

US 2017/0019594 A1 Jan. 19, 2017

(51) Int. Cl.
*H04N 7/18* (2006.01)
*H04N 5/232* (2006.01)
*H04N 5/222* (2006.01)
*H04N 13/00* (2018.01)
*H04N 13/02* (2006.01)
*G06T 3/40* (2006.01)
*H04N 5/247* (2006.01)

(52) U.S. Cl.
CPC ....... *H04N 5/23238* (2013.01); *G06T 3/4038* (2013.01); *H04N 5/222* (2013.01); *H04N 13/0022* (2013.01); *H04N 13/0242* (2013.01); *H04N 5/247* (2013.01); *H04N 2013/0081* (2013.01); *H04N 2013/0088* (2013.01)

(58) Field of Classification Search
CPC ... H04N 5/23238; H04N 2/247; H04N 5/3415
USPC ...................................... 348/36–61, 142–161
See application file for complete search history.

(56) References Cited

U.S. PATENT DOCUMENTS 9,007,432 B2 * 4/2015 Chuang ............ G08B 13/19619
                                                   348/39
2013/0155253 A1 6/2013 Wood

OTHER PUBLICATIONS

Image Stitching—Wikipedia; https://en.wikipedia.org/wiki/Image_stitching retrieved from the internet on Jul. 13, 2015, 5 pages.
Camera Module—Raspberry Pi, https://www.raspberrypi.org/products/camera-module/ ; retrieved from the internet on Jul. 13, 2015, 2 pages.

* cited by examiner

*Primary Examiner* — Andy Rao
(74) *Attorney, Agent, or Firm* — Zilka-Kotab, PC

(57) ABSTRACT

The present disclosure involves systems, software, and computer implemented methods for increasing spatial resolution of panoramic video captured by a camera array. In one example, a method may include identifying a captured image from each camera in a camera array associated with a capture of a panoramic video. The captured images are stitched together to generate at least one combined image and image mode homographies are calculated between the plurality of cameras in the camera array based on the stitching results. A plurality of captured video frames from each camera in the camera array are identified and video mode homographies of the plurality of cameras are determined based on the calculated image mode homographies. The determined video mode homographies are applied to stitch the plurality of captured video frames.

20 Claims, 4 Drawing Sheets

INCREASING SPATIAL RESOLUTION OF PANORAMIC VIDEO CAPTURED BY A CAMERA ARRAY

BACKGROUND

The present disclosure relates to computer systems and computer-implemented methods for increasing spatial resolution of panoramic video captured by a camera array.

Camera arrays can be used to capture videos that collectively cover a scene with a large field-of-view (FoV), so that panoramic videos with large spatial resolutions can be created. Video stitching is a critical post step in the post-processing stage to stitch individual captured videos frame-by-frame in order to generate a final output of a panoramic video. Video stitching algorithms generally rely on finding and matching common feature points between two video frames from neighboring cameras in the array.

An M by N camera array takes M multiplied by N video frame captures and later stitches those captures together to create one panoramic video. Cameras in the array need to have enough overlapping views to make the stitching algorithm work. View overlaps can reduce the spatial resolution of the final panoramic video.

SUMMARY

The present disclosure involves systems, software, and computer-implemented methods for increasing spatial resolution of panoramic video captured by a camera array. In one example, a method may include identifying a captured image from each camera in a camera array associated with a capture of a panoramic video. The captured images are stitched together to generate at least one combined image and image mode homographies are calculated between the plurality of cameras in the camera array based on the stitching results. A plurality of captured video frames from each camera in the camera array are identified and video mode homographies of the plurality of cameras are determined based on the calculated image mode homographies. The determined video mode homographies are applied to stitch the plurality of captured video frames.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
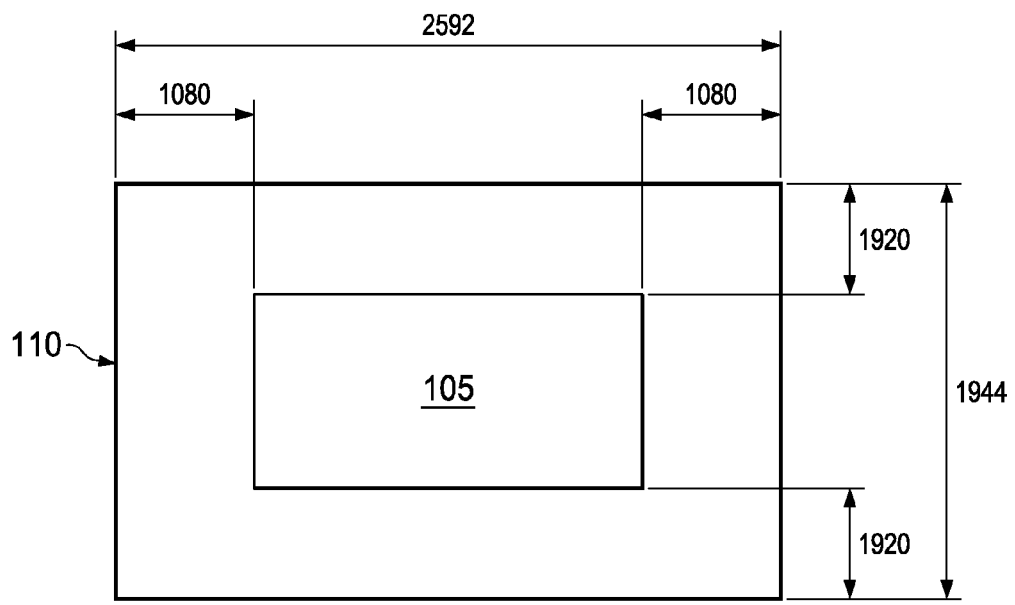
FIG. 1 is an illustration of an example difference between capturing areas of a video and image mode of an example camera.

The present disclosure describes a method and system for increasing spatial resolution of panoramic video captured by a camera array. Specifically, video captured from a camera array are stitched by taking advantages of an image mode stitch performed before the video stitching and used to calculate the required video stitching parameters. In the described method, each camera in the camera array can capture an image associated with the scene to be captured using the video mode of the cameras. These images can be captured in addition to the camera arrays normal video capture. The captured images—taken at or near the same time as one another—can be initially stitched together and serve as a reference to the homographies in video stitching. Homographies in image and video frame stitching relate to the connection and relationship between the images and video frames captured by neighboring and related cameras within the camera array. In some cases, a known geometry between the captured images and video frames of each the cameras in the array can be used to generate the stitched video frames. This solution can reduce the overlapping regions between views in the video capture and can therefore increase the spatial resolution of the output stitched panoramic video.

Many cameras now support both image and video captures, where image captures usually have larger fields-of-view (FoV), higher spatial resolution, and better image quality as compared to video captures. When using such cameras to capture panoramic videos, the methods described herein can provide for better and more efficient tools in finalizing and stitching the captured panoramic video frames.

In addition to taking video captures, each camera in the array captures an image at the same scene as the video, where the position and pose of the individual cameras and the camera array itself is intact. In the stitching state, the set of captured images are stitched together first. Because the image has a larger FoV and higher resolution than the corresponding video captures, the captured images are more likely to include a higher number of feature points, or key points, to be used by the stitching algorithms to identify how and where to stitch the images together. Feature detection is required to automatically stitch two or more images together. The feature detection is meant to find repeatable and distinctive key points, such as corners, edges, unique blobs, or other distinctive subject matter that is commonly found in overlapping sections of two or more images or video frames of neighboring cameras. Once those captured images are stitched, the image mode homographies between the cameras can be obtained.

The video mode homographies between cameras in the camera array it can then be derived based on the determined image mode homographies identified during the image mode stitching. Because captured images and video frames share capturing of the same relative scene or content, an operation of matching a captured video frame to the corresponding image using common feature points can be performed to find the homography between them. In some instances, knowledge regarding the camera's imaging sensor can be used to relate the geometry of the captured image to that of the captured video frame. By identifying the connection between images captured by the cameras of the camera array, knowledge or derived information related to the geometric mapping between the captured images and captured video frames of each camera can be used to stitch the captured video frames together. While video stitching can be a significant post-processing operation, image-based stitching can provide easier and better stitching operations. By using the image-based stitching to perform the video stitching process, the significant advantages described above can be realized.

Turning to FIG. 1, an illustration of the two capturing areas on an example CMOS sensor for image and video modes is shown. The example of FIG. 1 relates to a Raspberry Pi camera module. Any other suitable type of digital camera device may be used in other implementations, including camera functionality of a mobile device, dedicated imaging and video devices such as digital single-lens reflex camera (DSLR), mirrorless interchangeable-lens cameras, modular cameras, and any other type of suitable cameras capable of both image and video modes may be used. A Raspberry Pi camera module has different parameters in the two modes. In image mode, this camera module has a FoV of 53 degrees horizontally, 40 degrees vertically, and 66 degrees diagonally, with a resolution of 2592 pixels horizontally by 1944 pixels vertically. In video mode, the camera module has a field of view of 39 degrees horizontally, 22 degrees vertically, and 45 degrees diagonally, with a resolution of 1920 pixels horizontally and 1080 pixels vertically. The image mode offers a larger FoV and higher spatial resolution than video mode, with a 36% increase in horizontal FoV and an 80% increase in vertical FoV.

As illustrated in FIG. 1, the sensing area 105 for video mode is at the center of the sensing area 110 for the image mode. As illustrated, the image mode capturing area is 2592 pixels by 1944 pixels, where the video mode is 1920 pixels by 1080 pixels. With the information on the relative location of the two capturing areas, the video mode homography can be determined by a translation (in this example, 336 pixel horizontally and 432 pixel vertically) relative to its image mode homography.

Figure 2:
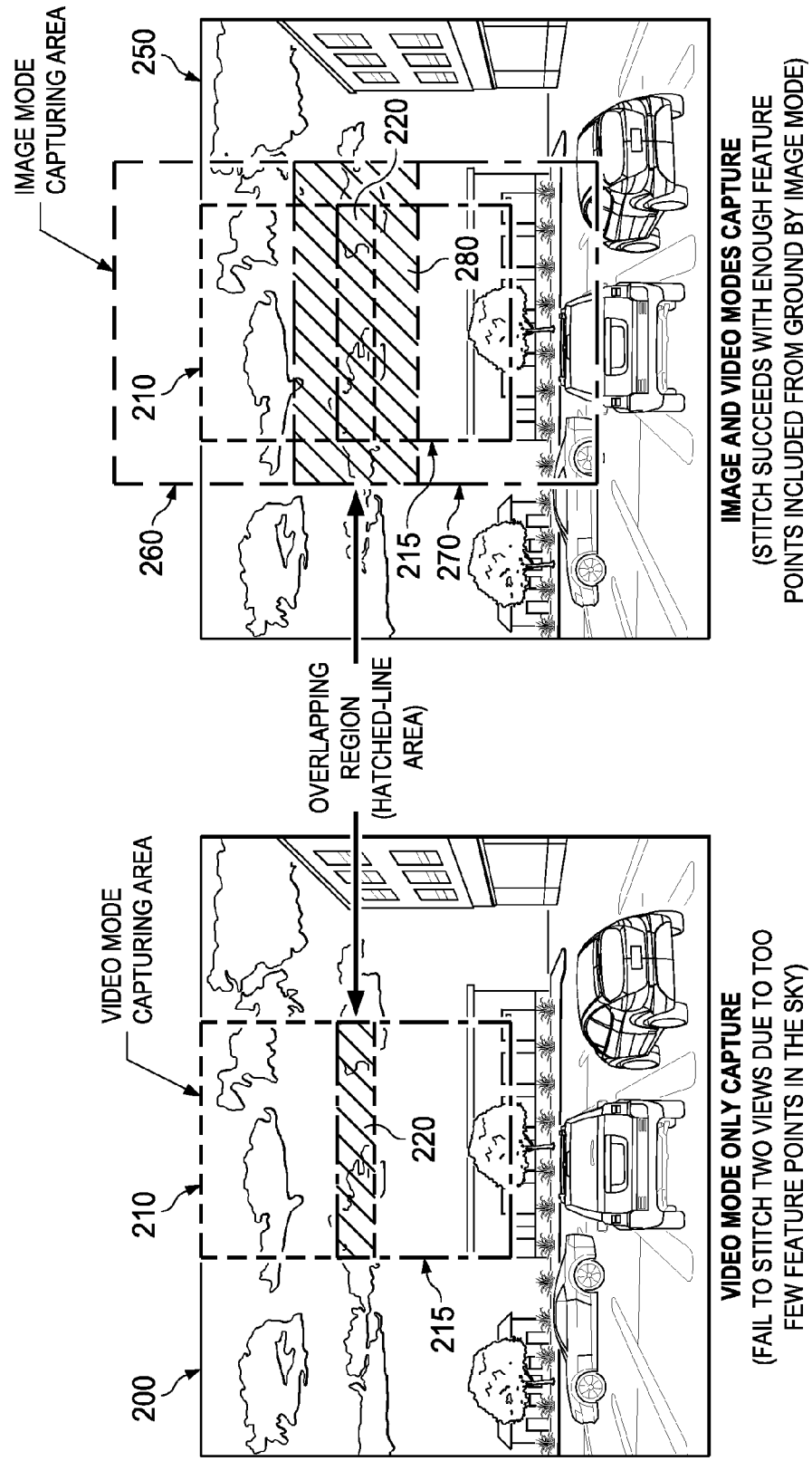
FIG. 2 is an illustration of an example improvement in video stitching available using the methods of the present disclosure.

Once the video mode homography is derived for each camera in the array, the video mode homographies can be used to stitch individual video captures, even in instances where particular neighboring video frames do not include enough feature points in the overlapping region. FIG. 2 is an illustration of an example improvement in video stitching available using the methods of the present disclosure. Scene 200 and 250 represent a common scene to be captured by a pair of camera arrays. In scene 200, only video mode-based capture is used to create the panoramic video, while in scene 250, a solution as described herein is used combining both image and video capture modes.

As illustrated in scene 200, a pair of neighboring cameras can capture a series of video frames (box 210 represents the video mode capture area of camera A and box 215 represents the video capture area of camera B) that overlap in area 220. As shown, two cameras in video mode only share a small overlapping region in the sky area, where there no significant feature points are present. When a video stitching algorithm is used on the neighboring video frames, the algorithm is likely to fail and not be able to stitch the two views.

As illustrated in scene 250, however, the image mode capture allows significant additional area for overlapping analysis and stitching algorithms. Due to the larger FoV in image mode, the overlapping region 280 between the two image mode capturing areas 260 and 270 is greatly extended. As illustrated, the overlapping portions of the captured images include significant feature points from the trees on the ground and the horizon line in overlapping region 280. Using these feature points, stitching is possible between the two images. Once the images are stitched, the stitched image can be used to provide homography reference to stitch two video captures together. In one case, a known geometric relationship between a particular image and the corresponding captured video frames for a camera can be applied. In others, such a relationship can be determined based on a mapping between the image and video frames. Using this methodology, the necessary overlapping region between two views in video capture is greatly reduced, thus helping to improve the spatial resolution of a stitched panoramic video captured by camera arrays.

In the case of a camera array made of Raspberry Pi camera modules, for example, the spatial resolution of the panoramic video may be increased 42% horizontally and 82% vertically. With the same target spatial resolution, the number of cameras in the camera array can be reduced—thereby reducing the cost and size of the array itself. Further, because more of the scene can be captured by the images, stitching of more challenging scene content may be available where it was not before.

Figure 3:
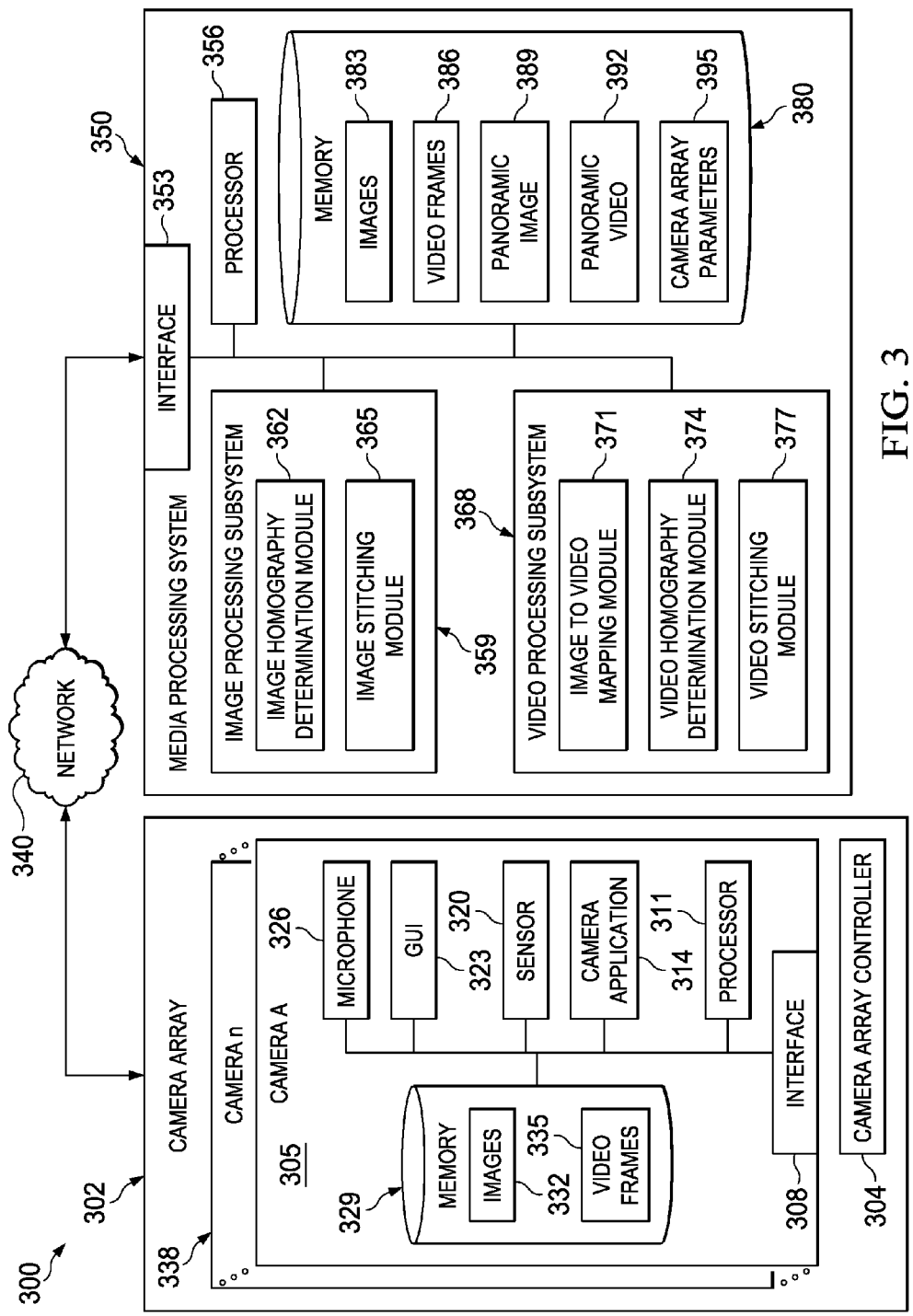
FIG. 3 is a block diagram illustrating an example system for increasing spatial resolution of panoramic video captured by a camera array.

FIG. 3 is a block diagram illustrating an example system 300 for increasing spatial resolution of panoramic video captured by a camera array. As illustrated in FIG. 3, system 300 is a multiple component system capable of capturing image and video frames via a plurality of cameras associated with a camera array 302 and processing the captured media to generate a panoramic video. In some instances, the camera array 302 itself may include functionality corresponding with media processing system 350. As illustrated, however, system 300 includes or is communicably coupled with a camera array 302, network 340, and media processing system 350. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

Camera array 302 includes a plurality of cameras A 305 through camera n 338. A camera array refers to a collection of cameras designed to function together to capture and stitch images and video frames together. The camera array 302 may be made of a plurality of devices, or the array 302 itself may be fabricated onto a single chip. In some instances, the camera array 302 and its plurality of cameras may be controlled by a camera array controller 304 used to manage and control operations of the cameras 305 through 338, including controlling both image and video mode operations. In doing so, the camera array controller 304 can instruct and cause the cameras within the array to capture images and video frames substantially concurrently and/or simultaneously with one another such that a much larger area can be captured by the synchronized image and/or video capture. Additionally, the camera array controller 304 may provide instructions or cause the operations to allow the camera 305 and any other cameras (e.g., camera 338) to each capture an image just prior to a video capture. In alternative instances, the images may be captured after the video capture. To perform the described operations, the image stitching process must be performed prior to the video stitching process—images and video frames may be captured at any time prior to these processes. The captured images can be stitched together and used as a basis to identify video mode homographies of the various cameras.

In some instances, the camera array 302 may be designed in a grid pattern represented in an m by n arrangement, where the camera array 302 includes m rows of camera modules and n columns of camera modules. If the grid is 5×5, then the camera array 302 will include 25 cameras. Other suitable design patterns may also be used, including irregular designs with non-uniform distances and orientations between the cameras.

Each camera 305 in the array 302 may include one or more of the following: interface 308, processor 311, camera application 314, sensor 320, graphical user interface (GUI) 323, microphone 326, and memory 329. Any suitable camera may be used, including combinations of different types of cameras within the same camera array 302.

Interface 308 is used by the camera 305 to communicate with other cameras in the camera array 302, the camera array controller 304, and/or the media processing system 350. In some instances, the interface 308 may communicate with one or more of these components via network 340. In other instances, interface 308 may communicate with the camera array controller 304, which in turn may use an interface of its own to communicate with the media processing system 350. Generally, the interfaces 308 (and 353) described herein comprises logic encoded in software and/or hardware in a suitable combination and operable to communicate with one or more of the illustrated components, including network 340. More specifically, the interface 308 (and 353) may comprise software supporting one or more communication protocols associated with communications such that the network 340 or the interface's hardware is operable to communicate physical signals within and outside of the illustrated environment 300.

Network 340 facilitates wireless or wireline communications between the components of the environment 300 (i.e., between various combination of the cameras, the camera array 302, and the media processing system 350, and among others), as well as with any other local or remote computer, such as additional clients, servers, or other devices communicably coupled to network 340, including those not illustrated in FIG. 3. In the illustrated environment, the network 340 is depicted as a single network, but may be comprised of more than one network without departing from the scope of this disclosure. In some instances, one or more of the illustrated components may be included within network 340 as one or more cloud-based services or operations. For example, the media processing system 350 may be a cloud-based service, or incorporate cloud-based functionality. The network 340 may be all or a portion of an enterprise or secured network, while in another instance, at least a portion of the network 340 may represent a connection to the Internet or a dedicated link or connection between devices. In some instances, a portion of the network 340 may be a virtual private network (VPN). Further, all or a portion of the network 340 can comprise either a wireline or wireless link. Example wireless links may include 802.11ac/ad,/af/a/b/g/n, 802.20, WiMax, LTE, Bluetooth, and/or any other appropriate wireless link. In other words, the network 340 encompasses any internal or external network, networks, sub-network, or combination thereof operable to facilitate communications between various computing components inside and outside the illustrated environment 300. The network 340 may communicate, for example, Internet Protocol (IP) packets, Frame Relay frames, Asynchronous Transfer Mode (ATM) cells, voice, video, data, and other suitable information between network addresses. The network 340 may also include one or more local area networks (LANs), radio access networks (RANs), metropolitan area networks (MANs), wide area networks (WANs), all or a portion of the Internet, and/or any other communication system or systems at one or more locations.

Returning to camera 305, a processor 311 is illustrated. Although illustrated as a single processor 311 in FIG. 3, two or more processors may be used in a single camera according to particular needs, desires, or particular implementations of the environment 300. Further, one processor 311 associated with the camera array 302 may control multiple cameras, such as via the camera array controller 304. Each processor 311 may be a central processing unit (CPU), an application-specific integrated circuit (ASIC), a field-programmable gate array (FPGA), or another suitable component. Generally, the processor 311 executes instructions and manipulates data to perform the operations of the camera 305. Specifically, the processor 311 executes the algorithms and operations described in the illustrated figures, including the operations associated with the camera application 314, as well as the operations associated with the various hardware components illustrated.

Camera application 314 may be a software program or operating system associated with camera 305. Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others. The camera application 314 can perform various operations of the camera 305, including optical and digital focus, and general camera management and operations. The camera application 314 may be associated with or linked to the camera array controller 304, such that camera operations may be managed or controlled by the camera array controller 304.

Camera 305 further includes a sensor 320. The sensor 320 may include a plurality of sensor elements or pixels. A light sensing element of the sensor 320 refers to an individual light sensing element in the camera 305, which can be, but is not limited to, a CMOS Image Sensor, CCD (charge-coupled device), high dynamic range pixel, and various alternatives thereof. In general, the sensor 320 refers to a two dimensional array of pixels used to capture an image formed on the sensor 320 by the optics of the imager. The sensor elements of each sensor 320 have similar physical properties and receive light through the same optical component. The sensor 320 may allow for both images and video frames to be captured. Other standard elements of various camera types may be present in various implementations. Each camera may include a lens, flash, shutter release, and other components.

The camera 305 may include a GUI 323, such as a viewfinder. Additionally, each camera may include a microphone 326 to capture audio signals during recording of the video frames. In some instances, the camera array 302 may be associated with a single microphone shared among the cameras.

Memory 329 may include any memory or database module and may take the form of volatile or non-volatile memory including, without limitation, magnetic media, optical media, random access memory (RAM), read-only memory (ROM), removable media, or any other suitable local or remote memory component. The memory 329 may store various camera-related objects or data, including images 332 and video frames 335, as well as various settings and information associated with the camera 305, including a known geometry between the capturing area in image mode and a capturing area in video mode. In some instances, memory 329 may include information defining information about neighboring cameras and/or the camera array 302 itself. Alternatively, the camera array 302 may include a dedicated memory or storage location for such information, including camera-specific information and information defining relationships between different cameras in the camera array 302. In other instances, some or all of this information may be stored as a set of camera array parameters 395 at the media processing system 350.

System 300 further includes the media processing system 350. While illustrated apart from the camera array 302, the media processing system 350 may be a part of or included in the camera array 302 and its related systems. Alternatively, the media processing system 350 may be a single computer, single system of computers, or a collection of systems apart from the camera array 302, where the media processing system 350 receives images 332 and video frames 335 captured by the cameras of the camera array 302 and processes those into corresponding panoramic images and videos.

As used in the present disclosure, the term "computer" is intended to encompass any suitable processing device. For example, media processing system 350 may be any computer or processing device such as, for example, a blade server, general-purpose personal computer (PC), Mac®, workstation, UNIX-based workstation, or any other suitable device. Moreover, although FIG. 3 illustrates media processing system 350 as a single system, media processing system 350 can be implemented using two or more systems, as well as computers other than servers, including a server pool. In other words, the present disclosure contemplates computers other than general-purpose computers, as well as computers without conventional operating systems. Further, illustrated media processing system 350 may be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, media processing system 350 may be any suitable backend computing server or system performing image and video processing functionality. The media processing system 350 may be associated with a single camera array 302 or multiple camera arrays, and can perform image and video stitching operations, as well as the combination of operations described in the present application. However, the media processing system 350 may, in some implementations, be a part of a larger system providing additional functionality. For example, media processing system 350 may be part of an application suite providing one or more digital media operations, image and video editing functionality, and others.

In the specific operations associated with the present solution, the media processing system 350 can identify (e.g., receive and/or retrieve) one or more images and video frames associated with a panoramic video to be created. The media processing system 350 includes interface 353 (similar to or different from interface 308), at least one processor 356 (similar to or different from processor 311), an image processing subsystem 359, a video processing subsystem 368, and memory 380. The interface 353 can allow the media processing system 350 to communicate with the camera array 302, individual cameras 305, 338, and other components connected to network 340. Processor 356 can manage and execute the operations associated with the image processing subsystem 359 and the video processing subsystem 368.

The image processing subsystem 359 includes an image homography determination module 362 and an image stitching module 365. The image processing subsystem 359 may identify the images 383 taken by the cameras within a camera array 302 prior to video frames being captured. Using these images, the image processing system 359 can, via the image homography determination module 362, determine one or more feature points between neighboring cameras within the camera array 302. Using the feature points and identifying the relationship between the images taken by the cameras of the array, the image stitching module 365 can execute to generate a panoramic image 389 stitched together from the plurality of images 383. This panoramic image 389 resulting from the image mode stitching can then be use by the video processing subsystem 368 to create the panoramic video 392 from the captured video frames 386.

The video processing subsystem 368 includes an image to video mapping module 371, a video homography determination module 374, and a video stitching module 377. The image to video mapping module 371 can perform operations to identify translations between how an image capture area of a particular camera corresponds to the video frame capture area of that camera. In some instances, the translation may be known such that the image to video mapping module 371 simply locates pre-existing information on the known geometry between the captured images and captured video frames of a particular camera. In some instances, this information may be stored in the camera array parameters 395, or may be available based on information about the camera 305, 338 itself.

The video homography determination module 374 determines the video mode homography of the video frames 386 based on the information derived or known by the image to video mapping module 371. Based on how the various images 383 are stitched by the image processing subsystem 359 and the known geometry between the image and video modes of each camera, the video homography determination module 374 can apply the identified translations to the video frames 386 based on their relationship to the images 383 to identify where and how the video frames 386 are to be stitched. The video stitching module 377 can receive the translation information and perform the video stitching for corresponding video frames 386 taken at the same or near-same time.

Using this solution, the determined image homography and the known translations can be used as the stitching solution for the video mode's panoramic video 392, which allows quicker determinations as to the video stitching with increased spatial recognition. In prior solutions, feature points in overlapping video frames would need to be found to perform the stitching operations. In the present solution, as the capturing area of the image mode is much larger than the capturing area of the video mode, non-overlapping video frames that may have few or no feature points can still be stitched. Further, less portions of the captured video frames may be lost due to overlap in order to perform the stitching, allowing more of each video frame to be used in the panoramic video.

Memory 380 may be similar to or different from memory 329 of camera 305. In general, memory 380 can store images 383 and video frames 386 received from the camera array 302, and can further store generated panoramic images 389 and panoramic videos 392. Further, as described above, memory 380 can store camera array parameters 395, including associated with individual cameras, their neighbors, and the array 302 itself.

While portions of the software elements illustrated in FIG. 3 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 4:
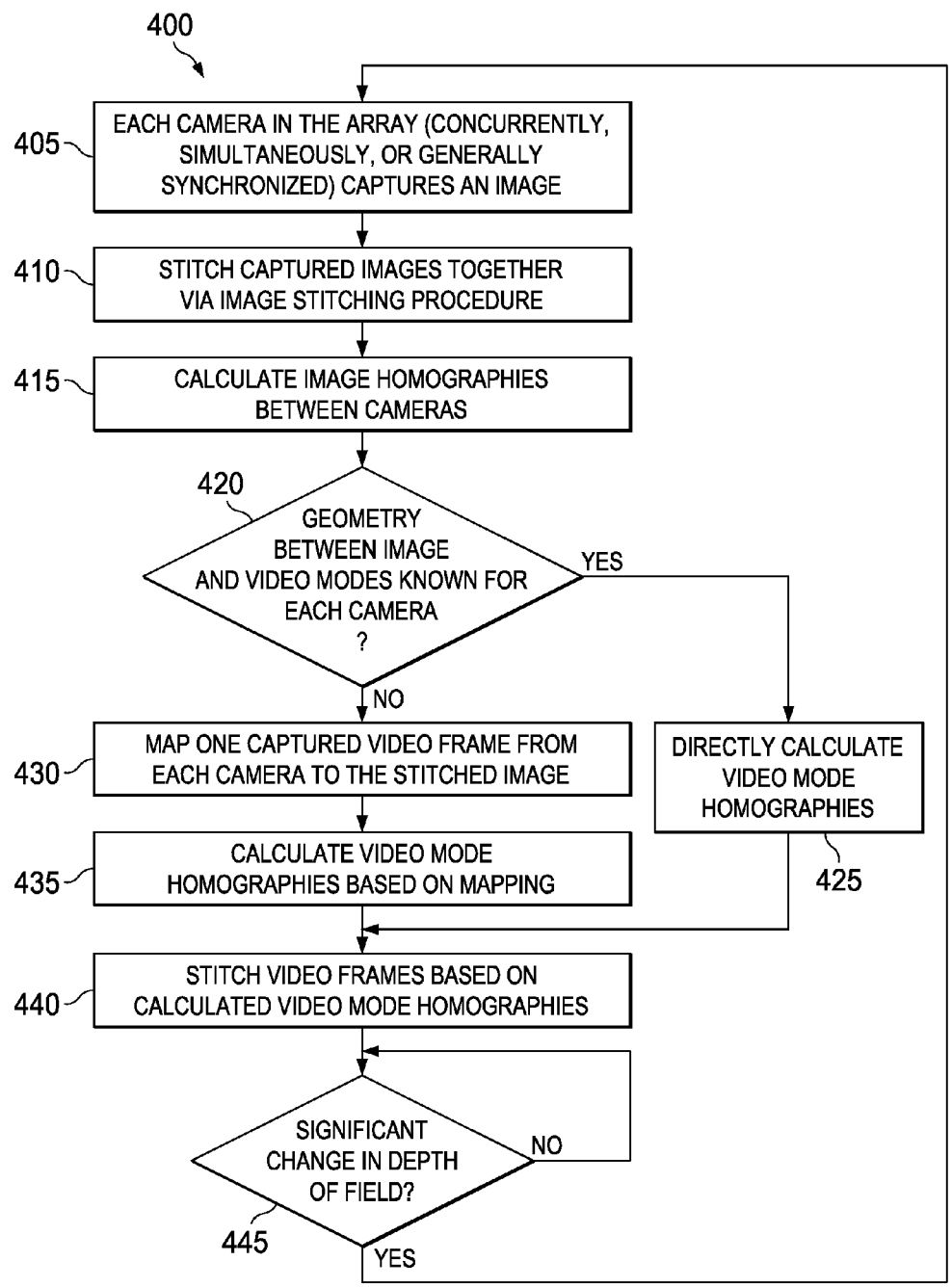
FIG. 4 is a flowchart of example operations for increasing spatial resolution of panoramic video captured by a camera array.

FIG. 4 is a flowchart of example operations for increasing spatial resolution of panoramic video captured by a camera array. For clarity of presentation, the description that follows generally describes method 400 in the context of the system 300 illustrated in FIG. 3. However, it will be understood that method 400 may be performed, for example, by any other suitable system, environment, software, and hardware, or a combination of systems, environments, software, and hardware as appropriate. In the described method 400, the operations may be performed locally at a camera array or at a separate, potentially remote, system.

At 405, each camera in the camera array captures an image corresponding to the scene in which the panoramic video is to be captured. A camera array controller may manage and/or coordinate the synchronous image capture to allow for concurrent, simultaneous, or otherwise synchronized image captures. In some instances, a single instruction from the camera array may cause each camera in the array to capture an image.

At 410, the captured images are stitched together to generate a combined image. The combined image may be a panoramic image, and may be stitched together based on a known structure of the underlying camera array, or be stitched together based on detection and matching of feature points between pair of images taken from neighboring and nearby cameras within the camera array. In such instances, neighboring images can be analyzed to determine overlapping portions and corresponding points of interest, such as corners, distinctive content, and the like. The image may be generated based on the location of the particular camera from which an image was captured. However, stitching based on camera array physical configurations may not be practical due to the level of precision required to perform the stitching algorithm. Any other suitable method of performing image stitching may be used.

At 415, a set of image homographies are calculated for the camera array based on the stitching results. The set of image homographies may be calculated specifically between pairs of neighboring cameras, and can use traditional and current image mode homography calculations (e.g., image stitching algorithms in the openCV library). In general, one or more feature points found in overlapping neighboring images are used to identify where and how neighboring images are related. In some instances, multiple matched feature points may be required for adequate stitching between images—a single overlapping feature point may not be adequate. Using this information, the image mode homography is calculated to determine how to finalize the combined image.

At 420, a determination is made as to whether particular geometries between image mode capturing areas and video mode capturing areas are known for each camera. The particular geometries define the video mode capturing area relative to the image mode capturing area, and describe what portions of the image mode capturing area are included in the video mode capturing area. In some cases the video mode capturing area may be centered within the image mode capturing area, while in others, some offset or difference may be present.

If the geometry is known, method 400 continues at 425 where a video mode homography for each of the cameras in the camera array is directly calculated based on the known geometry. If, however, the geometry is not known, method 400 continues to 430.

At 430, captured video frames for each camera which does not have a known geometry are mapped to the corresponding image. The mapping process can be performed based on the single image captured by the corresponding camera, or the mapping can be from the captured video frame to the stitched panoramic image. At 435, a video mode homography is then calculated based on the mapping.

At 440, the captured video frames are stitched together based on the calculated video mode homographies calculated at 425 and/or 435. Instead of performing a standard video mode stitching and homography determination, 440 uses the known geometries from the image to video mode translations of each camera to stitch and generate each panoramic video frame. The panoramic video frames can then be combined sequentially to generate the panoramic video.

At 445, a determination is made as to whether a significant change in the depth of field of the camera array has occurred. Whether a change is significant may depend on the current location relative to the scene of the camera array, the sensitivity of the cameras in the camera array, and/or personal preferences or default threshold values of the system. If the depth of field has changed significantly, a new set of image and video homographies may be needed to perform the stitching. In those instances, method 400 returns to 405 and performs the operations again. If no significant change to the depth of field is determined to be made, then method 400 remains at 445 until such a change occurs.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by at least one processor, the method comprising:
   identifying a captured image from each camera in a camera array associated with a capture of a panoramic video, the camera array comprising a plurality of cameras, each camera operable to capture both images and video in respective image capture and video capture modes;
   stitching the captured images together to generate at least one combined image;
   calculating image mode homographies between the plurality of cameras in the camera array based on the stitching results;
   identifying a plurality of captured video frames from each camera in the camera array;
   determining video mode homographies of the plurality of cameras in the camera array based on the calculated image mode homographies; and
   applying the determined video mode homographies to stitch the plurality of captured video frames.

2. The method of claim 1, wherein the image capture mode of each camera provides a relatively larger field-of-view, higher spatial resolution, and higher image quality than the corresponding video mode of the camera.

3. The method of claim 1, wherein the captured image and video frames capture the same scene.

4. The method of claim 1, wherein the images are captured at each camera immediately prior to capturing the video frames.

5. The method of claim 1, wherein calculating image mode homographies between the plurality of cameras in the camera array based on the stitching results comprises calculating image mode homographies between each of the neighboring cameras in the camera array.

6. The method of claim 1, wherein determining video mode homographies is based on identified geometry between the image mode and video mode of each camera and further comprises:
   identifying a known geometric relation between images captured in the image mode and video frames captured in the video mode of each camera; and
   using the known geometric relation as the video mode homography for each camera.

7. The method of claim 6, wherein the known geometric relation between the images and the video frames of a particular camera defines a relative position within a captured image where a corresponding video frame is located.

8. The method of claim 1, wherein determining video mode homographies is based on identified geometry between the image mode and video mode of each camera and further comprises:
   mapping a captured video frame from each camera to the stitched image; and
   calculating video mode homographies based on the mapping.

9. The method of claim 1, wherein stitching the captured images together to generate at least one combined image includes identifying a plurality of feature points between captured images of neighboring cameras in the camera array.

10. The method of claim 1, further comprising, in response to a change of a field of depth of the camera array relative to a subject of the image and video frames:
    identifying a second captured image from each camera in the camera array;
    stitching the captured second images together to generate at least one revised combined image;
    calculating second image mode homographies between the plurality of cameras in the camera array based on the revised stitching results;
    identifying a second plurality of captured video frames from each camera captured after the second images are captured;
    determining second video mode homographies of the plurality of cameras in the camera array based on the calculated image mode homographies; and
    applying the determined second video mode homographies to stitch the second plurality of captured video frames.

11. A non-transitory, computer-readable medium storing computer-readable instructions executable by a processor and configured to:
    identify a captured image from each camera in a camera array associated with a capture of a panoramic video, the camera array comprising a plurality of cameras, each camera operable to capture both images and video in respective image capture and video capture modes;
    stitch the captured images together to generate at least one combined image;
    calculate image mode homographies between the plurality of cameras in the camera array based on the stitching results;
    identify a plurality of captured video frames from each camera in the camera array;
    determine video mode homographies of the plurality of cameras in the camera array based on the calculated image mode homographies; and
    apply the determined video mode homographies to stitch the plurality of captured video frames.

12. The computer-readable medium of claim 11, wherein the captured image and video frames capture the same scene.

13. The computer-readable medium of claim 11, wherein calculating image mode homographies between the plurality of cameras in the camera array based on the stitching results comprises calculating image mode homographies between each of the neighboring cameras in the camera array.

14. The computer-readable medium of claim 11, wherein determining video mode homographies is based on identified geometry between the image mode and video mode of each camera and further comprises:
    identifying a known geometric relation between images captured in the image mode and video frames captured in the video mode of each camera; and
    using the known geometric relation as the video mode homography for each camera.

15. The computer-readable medium of claim 14, wherein the known geometric relation between the images and the video frames of a particular camera defines a relative position within a captured image where a corresponding video frame is located.

16. The computer-readable medium of claim 11, wherein determining video mode homographies is based on identified geometry between the image mode and video mode of each camera and further comprises:
    mapping a captured video frame from each camera to the stitched image; and
    calculating video mode homographies based on the mapping.

17. The computer-readable medium of claim 11, wherein stitching the captured images together to generate at least one combined image includes identifying a plurality of feature points between captured images of neighboring cameras in the camera array.

18. The computer-readable medium of claim 11, the computer-readable instructions further configured to, in response to a change of a field of depth of the camera array relative to a subject of the image and video frames:
- identify a second captured image from each camera in the camera array;
- stitch the captured second images together to generate at least one revised combined image;
- calculate second image mode homographies between the plurality of cameras in the camera array based on the revised stitching results;
- identify a second plurality of captured video frames from each camera captured after the second images are captured;
- determine second video mode homographies of the plurality of cameras in the camera array based on the calculated image mode homographies; and
- apply the determined second video mode homographies to stitch the second plurality of captured video frames.

19. A system, comprising:
- a camera array associated with a capture of a panoramic video, the camera array comprising a plurality of cameras, each camera operable to capture both images and video in respective image capture and video capture modes;
- a memory;
- at least one hardware processor interoperably coupled with the memory and configured to:
  - identify a captured image from each camera in the camera array associated with the capture of the panoramic video;
  - stitch the captured images together to generate at least one combined image;
  - calculate image mode homographies between the plurality of cameras in the camera array based on the stitching results;
  - identify a plurality of captured video frames from each camera in the camera array;
  - determine video mode homographies of the plurality of cameras in the camera array based on the calculated image mode homographies; and
  - apply the determined video mode homographies to stitch the plurality of captured video frames.

20. The system of claim 19, wherein determining video mode homographies is based on identified geometry between the image mode and video mode of each camera and further comprises:
- identifying a known geometric relation between images captured in the image mode and video frames captured in the video mode of each camera; and
- using the known geometric relation as the video mode homography for each camera.

* * * * *